US012693704B2

(12) United States Patent (10) Patent No.: US 12,693,704 B2
Shen et al. (45) Date of Patent: Jul. 28, 2026

(54) SLIDE ROLL APPARATUS AND DISPLAY APPARATUS

(71) Applicant: BOE Technology Group Co., Ltd., Beijing (CN)

(72) Inventors: Youqing Shen, Beijing (CN); Junhuan Liu, Beijing (CN); Lupeng Bian, Beijing (CN); Hong Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 131 days.

(21) Appl. No.: 18/853,034

(22) PCT Filed: Jan. 16, 2024

(86) PCT No.: PCT/CN2024/072627
§ 371 (c)(1),
(2) Date: Sep. 30, 2024

(87) PCT Pub. No.: WO2024/169500
PCT Pub. Date: Aug. 22, 2024

(65) Prior Publication Data
US 2025/0224764 A1 Jul. 10, 2025

(30) Foreign Application Priority Data

Feb. 16, 2023 (CN) .......................... 202310148705.7

(51) Int. Cl.
*G06F 1/16* (2006.01)
(52) U.S. Cl.
CPC .......... *G06F 1/1624* (2013.01); *G06F 1/1652* (2013.01)

(58) Field of Classification Search
CPC combination set(s) only.
See application file for complete search history.

(56) References Cited

U.S. PATENT DOCUMENTS 11,687,128 B2 * 6/2023 Lee ........................... G06F 1/16
361/679.01
12,063,754 B2 * 8/2024 Chun .................... H05K 5/0217
12,111,697 B2 * 10/2024 Luo ......................... G09F 9/301
(Continued)

FOREIGN PATENT DOCUMENTS

CN 113888981 A 1/2022
CN 114170911 A 3/2022
(Continued)

*Primary Examiner* — Lisa Lea-Edmonds
(74) *Attorney, Agent, or Firm* — IPro, PLLC

(57) ABSTRACT

Provided are a slide roll apparatus and a display apparatus. The slide roll apparatus is used for assisting the flexible display module in sliding rolling and unfolding, and the flexible display module is provided with a first side edge and a second side edge; the slide roll apparatus comprises a fixed housing, a movable housing, a sliding track, a support structure and an outer support structure; the fixed housing comprises a mounting structure at least being used for fixing the first side edge of the flexible display module in place; the movable housing reciprocates in the X direction relative to the fixed housing; the sliding track is arranged on at least one side of the movable housing in the Y direction; the support structure is located on one side of the movable housing and is slidably arranged in the sliding track along an arc-shaped path.

15 Claims, 20 Drawing Sheets

(56) References Cited

U.S. PATENT DOCUMENTS

| 12,192,393 | B2 * | 1/2025 | Choi | H04M 1/0268 |
| 12,253,886 | B2 * | 3/2025 | Zhao | G09F 9/30 |
| 12,279,388 | B2 * | 4/2025 | Kim | H05K 5/0217 |
| 12,457,885 | B2 * | 10/2025 | Liu | H10K 77/111 |
| 12,464,658 | B2 * | 11/2025 | Wang | G06F 1/1652 |
| 12,547,212 | B2 * | 2/2026 | Wei | G06F 1/1652 |
| 12,560,980 | B2 * | 2/2026 | Lin | G06F 1/1652 |
| 2021/0242420 | A1 * | 8/2021 | Luo | G06F 1/1652 |
| 2022/0183173 | A1 * | 6/2022 | Kim | G06F 1/1698 |
| 2022/0418123 | A1 * | 12/2022 | Liu | H04M 1/0237 |
| 2023/0132282 | A1 * | 4/2023 | Kim | G09F 9/301 |
| | | | | 361/679.01 |
| 2023/0239384 | A1 * | 7/2023 | Lim | H04M 1/0237 |
| | | | | 361/679.01 |
| 2024/0203310 | A1 * | 6/2024 | Noh | G09G 3/035 |
| 2024/0243683 | A1 * | 7/2024 | Kang | G06F 1/1624 |
| 2024/0310876 | A1 * | 9/2024 | Zhao | G06F 1/1656 |
| 2024/0373567 | A1 * | 11/2024 | Wang | G06F 1/1652 |
| 2025/0021131 | A1 * | 1/2025 | Wei | G06F 1/1652 |
| 2025/0093917 | A1 * | 3/2025 | Lin | G06F 1/1652 |
| 2025/0098080 | A1 * | 3/2025 | Wang | G06F 1/1624 |
| 2025/0224764 | A1 * | 7/2025 | Shen | G06F 1/1624 |
| 2025/0240903 | A1 * | 7/2025 | Kim | G06F 1/1652 |
| 2025/0318059 | A1 * | 10/2025 | Zhu | H04M 1/0268 |
| 2025/0355464 | A1 * | 11/2025 | Liu | G06F 1/1624 |
| 2026/0020169 | A1 * | 1/2026 | Wang | G06F 1/1652 |

FOREIGN PATENT DOCUMENTS

| CN | 114338858 | A | 4/2022 |
| CN | 114598759 | A | 6/2022 |
| CN | 115424525 | A | 12/2022 |
| CN | 116486699 | A | 7/2023 |
| KR | 20220076252 | A | 6/2022 |

* cited by examiner

A-A

B-B

552

551          55

54          541

211
2

P

SLIDE ROLL APPARATUS AND DISPLAY APPARATUS

CROSS REFERENCE TO RELATED APPLICATION

This application is a national phase entry under 35 U.S.C § 371 of International Application No. PCT/CN2024/072627, filed on Jan. 16, 2024, which claims the priority of the Chinese patent application filed with the China National Intellectual Property Administration on Feb. 16, 2023, with application No. 202310148705.7 and entitled "SLIDE ROLL APPARATUS AND DISPLAY APPARATUS", all contents of which are incorporated by reference in this application.

TECHNICAL FIELD

The embodiments of the present disclosure relate to the technical field of display, and in particular to a sliding and rolling device and a display apparatus.

BACKGROUND

Flexible display screens have good folding and bending properties, which makes it possible to design new display apparatuses. With slidable display apparatuses, a screen display area can be changed according to the needs of users in different scenarios, which will become an important development direction of flexible display in the future.

Sliding and rolling is another innovative application field of flexible display panels. This form allows consumers to switch a display area of the flexible panel at will according to their needs. This is not only convenient for users to carry it with them, but also provides users with a better user experience than folding display panels. It is an important direction for the development of flexible display panels. By rolling and unrolling, the product can be freely converted between mobile phones and tablets, realizing the expansion and reduction of the display area, which can be applied to different usage scenarios of different consumer groups.

SUMMARY

Embodiments of the present disclosure provides a sliding and rolling device and a display apparatus, which is used for constraining the amount of arching of a flexible display module and the amount of lifting of a second side edge of the flexible display module during the sliding and rolling process of the sliding and rolling device along an X direction.

In a first aspect, the present disclosure provides a sliding and rolling device, where the sliding and rolling device is configured for assisting a flexible display module in rolling and unrolling by sliding, the flexible display module includes a first side edge and a second side edge arranged opposite to each other;

the sliding and rolling device includes:

a fixed housing, including a mounting structure, where the mounting structure is at least configured for fixing the first side edge of the flexible display module;

a movable housing, configured to reciprocate in the X direction relative to the fixed housing;

a sliding track, arranged on at least one side of the movable housing in a Y direction, where the Y direction is perpendicular to the X direction, and a plane formed by the X direction and the Y direction is parallel to the flexible display module;

a support structure, arranged on a side of the movable housing, where the support structure is slidably arranged in the sliding track along an arc path, a side of the support structure away from the movable housing is configured for supporting the flexible display module and is relatively fixed to at least the second side edge of the flexible display module, and the flexible display module is configured to slide along the X direction with the support structure;

an external support structure, contacting the movable housing along the Y direction, where when the flexible display module unrolls, the external support structure abuts against both the support structure and the movable housing to provide a supporting force along the Y direction to the support structure, so that a distance between the support structure and the sliding track in the Y direction is reduced.

The movable housing slides relative to the fixed housing along the X direction to realize slidable rolling and unrolling of the flexible display module. Specifically, the sliding track is provided on at least one side of the movable housing along the Y direction, and the support structure is slidably provided in the sliding track. Here, at least the first side edge of the flexible display module is pasted on the mounting structure of the fixed housing to prevent the flexible display module from moving relative to the fixed housing during the sliding and rolling process. The second side edge of the flexible display module is relatively fixed to the support structure. When the support structure performs a track-type sliding movement along the sliding track, the movable housing is pushed by the driving force to slide the support structure along the X direction, and the second side edge of the flexible display module is driven to slide, so as to increase the display area of the flexible display module. There is relative movement between the flexible display module and the movable housing. The support structure performs a track-type sliding movement along the sliding track. The sliding track can constrain the flexible display module to reduce the displacement in the Z direction, and the sliding track can also constrain the amount of arching along the X direction and the amount of lifting of the second side edge of the flexible display module during the sliding and rolling process of the flexible display module. The external support structure limits the bending and arching of the support structure in the Y direction, that is, it applies a tension force to the flexible display module in the Y direction, thereby reducing the amount of arching of the flexible display module along the Y direction. In addition, the external support structure only applies the tension force to the flexible display module in the Y direction when the display apparatus is completely slid open, thereby ensuring the flatness of the flexible display module in an unrolling state and improving the display effect of the flexible display module. Of course, during the sliding and rolling process, the external support structure does not provide the tension force to the support structure in the Y direction, so that the external support structure cannot contact the support structure, thereby preventing friction loss to the support structure.

Optionally, the sliding track includes a track body, and the track body is provided with a sliding groove;

an opening of the sliding groove faces the movable housing, the sliding groove is a U-shaped structure, and an opening of the U-shaped structure faces the movable housing;

the support structure includes a support body and a support portion, the support portion is arranged in the Y direction of the support body and is provided with a protrusion, the protrusion protrudes in a direction away from the support body and has a sliding fit with the sliding groove.

Optionally, the support body includes: a plurality of support bars, the plurality of support bars are arranged in parallel and spaced apart along the X direction, and each of the plurality of support bars extends along the Y direction;

the support bar is arranged corresponding to the protrusion.

Optionally, the fixed housing includes a guide structure connected to the mounting structure, the guide structure includes a plurality of guide bars, the plurality of guide bars are arranged in parallel and spaced apart along the Y direction, and each of the plurality of guide bars extends along the X direction;

the movable housing includes: a bottom plate and a plurality of insertion bars, wherein the plurality of insertion bars are arranged on a side of the bottom plate facing the support structure, the plurality of insertion bars are arranged in parallel and spaced apart along the Y direction, and each of the plurality of insertion bars extends along the X direction;

at least one of the insertion bars is corresponding to a gap area between any two adjacent guide bars.

Optionally, the sliding and rolling device further includes the external support structure, the external support structure abuts against a first insertion bar of the plurality of insertion bars along the Y direction;

during movement of the movable housing relative to the fixed housing along the X direction, the flexible display module switches between a rolling state and an unrolling state;

when the flexible display module is in the unrolling state, the external support structure abuts against the support portion, to provide a supporting force along the Y direction to the support structure.

Optionally, when the flexible display module is in the rolling state, the insertion bar of the movable housing cooperates with the guide bar of the fixed housing, the insertion bar is inserted between two adjacent guide bars, and the external support structure is arranged along the Y direction and between the first insertion bar of the plurality of insertion bars and a first guide bar of the plurality of guide bars;

when the flexible display module is in the unrolling state, the insertion bar of the movable housing and the guide bar of the fixed housing are staggered, and the external support structure abuts against the support portion to provide a supporting force along the Y direction to the support structure.

Optionally, the external support structure includes: a spring block, a connecting member and an elastic member;

when the flexible display module is in the rolling state, the spring block is arranged between the first insertion bar and the first guide bar, the connecting member penetrates through the spring block along the Y direction, and the connecting member partially extends into the first insertion bar, a gap is provided between the spring block and the first insertion bar, the elastic member is arranged in the gap, and the elastic member has elastic potential energy for moving the spring block in a direction away from the first insertion bar.

Optionally, the connecting member has a step surface, the spring block has a stepped hole, the connecting member passes through the stepped hole, one end surface diameter of the stepped hole facing the first insertion bar is smaller than the other end surface diameter of the stepped hole, the step surface and the stepped hole limit a movement path length of the connecting member in the stepped hole, and a distance that the elastic member pops out is smaller than the movement path length.

Optionally, the spring block has a first inclined surface, the first guide bar has a second inclined surface, and the first inclined surface is parallel to the second inclined surface.

Optionally, a quantity of external support structures is two, and along the Y direction, the external support structures are respectively arranged at the first and last two insertion bars of the plurality of insertion bars.

Optionally, when the flexible display module is in the rolling state, the insertion bar of the movable housing cooperates with the guide bar of the fixed housing, the insertion bar is inserted between two adjacent guide bars, and the external support structure is provided along the Y direction and between the first guide bar of the plurality of guide bars and the sliding track;

when the flexible display module is in the unrolling state, the insertion bar of the movable housing and the guide bar of the fixed housing are staggered, and the external support structure abuts against the support portion to provide a supporting force along the Y direction to the support structure.

Optionally, the external support structure includes: a spring block and a torsion spring; the first guide bar is provided with a positioning column;

one end of the torsion spring is connected to the first insertion bar, the torsion spring bypasses the positioning column, and the other end of the torsion spring is connected to the spring block.

Optionally, the spring block has a protrusion block, and the bottom plate of the movable housing has a groove corresponding to the protrusion block;

or, the spring block has a groove, and the bottom plate of the movable housing has a protrusion block corresponding to the groove.

Optionally, the sliding and rolling device further includes a push rod;

the push rod is detachably arranged on a side of the movable housing away from the fixed housing, an outer surface of the push rod is adapted to the support structure, and the push rod is always in contact with the support structure.

In a second aspect, the present disclosure provides a display apparatus, including the sliding and rolling device of any one of the first aspect, and further including the flexible display module; the flexible display module is arranged on a side of the support structure and the fixed housing in the sliding and rolling device, and the sliding and rolling device is configured for assisting the flexible display module in rolling and unrolling by sliding.

BRIEF DESCRIPTION OF FIGURES

In order to more clearly illustrate the technical solutions in the embodiments of the present disclosure, the drawings required in the description of the embodiments will be briefly introduced below. Obviously, the drawings described below are only some embodiments of the present disclosure. For one of ordinary skill in the art, other drawings can be obtained based on these drawings without any creative labor.

Description of the figures: 01—flexible display module; a1—first side edge; a2—second side edge; 011—sliding—rolling active area; 012—display fixed area; 1—fixed housing; 11—mounting structure; 12—guide structure; 121—guide bar; 121*a*—first guide bar; 121*b*—last guide bar; 1211—second inclined surface; 2—movable housing; 21—bottom plate; 211—groove; 22—insertion bar; 22*a*—first insertion bar; 22*b*—last insertion bar; 3—sliding track;

31—track body; 311—sliding groove; 3111—opening; 312—mounting groove; 4—support structure; 41—support body; 411—support bar; 42—support portion; 421—protrusion; 422—abutment block; 5—external support structure; 51—spring block; 511—stepped hole; 5111—step plane; 512—first inclined surface; 52—connecting member; 521—step surface; 53—elastic member; 54—spring block; 541—protrusion block; 55—torsion spring; 551—first end; 552—second end; 56—positioning column; 6—push rod.

DETAILED DESCRIPTION

In order to make the purpose, technical solutions and advantages of the present disclosure clearer, the present disclosure will be further described in detail below in conjunction with the accompanying drawings. Obviously, the described embodiments are only part of the embodiments of the present disclosure, rather than all of the embodiments. Based on the embodiments in the present disclosure, all other embodiments obtained by one of ordinary skill in the art without creative labor are within the scope of protection of the present disclosure.

Figure 1:
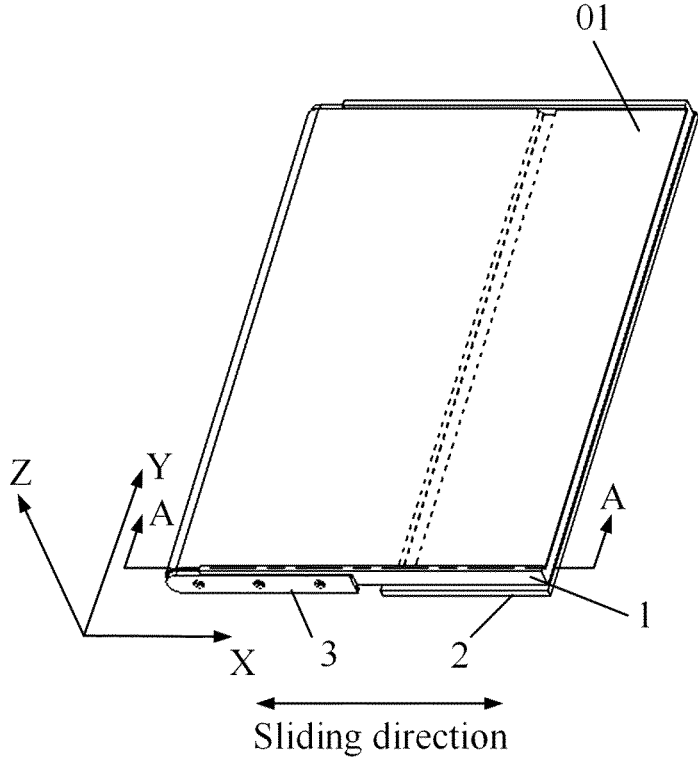
FIG. 1 is a schematic structural diagram of a display apparatus in a rolling state provided by embodiments of the present disclosure.

To facilitate the understanding, as shown in FIG. 1, the X direction (X axis), Y direction (Y axis) and Z direction (Z axis) involved in the embodiments of the present disclosure constitute a spatial rectangular coordinate system. The spatial rectangular coordinate system is three mutually perpendicular axes through a fixed point O in space, all of which take O as the origin and have the same unit length. These three axes are respectively called the X axis (horizontal axis), the Y axis (longitudinal axis), and the Z axis (vertical axis), collectively referred to as coordinate axes. The X direction is a direction of movement of a movable housing 2 relative to a fixed housing 1, the Y direction is perpendicular to the X direction, and a plane formed by the X direction and the Y direction is parallel to a display area of the flexible display module 01, and the Z direction is a thickness direction of the display apparatus, that is, perpendicular to the plane formed by the X direction and the Y direction.

Figure 2:
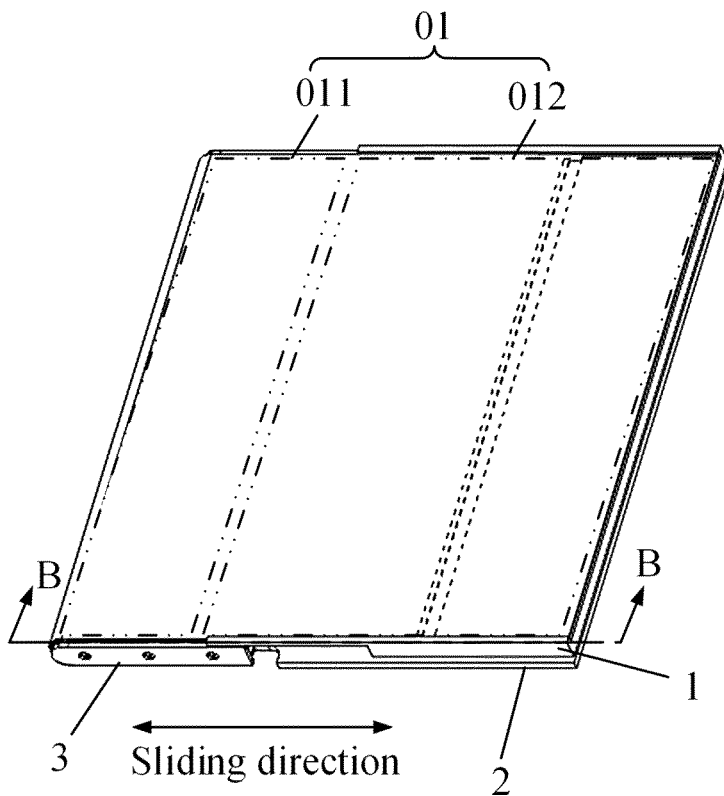
FIG. 2 is a schematic structural diagram of a display apparatus in an unrolling state provided by embodiments of the present disclosure.

As shown in FIGS. 1 and 2, FIG. 1 is a schematic structural diagram of a display apparatus in a rolling state, and FIG. 2 is a schematic structural diagram of a display apparatus in an unrolling state. A flexible display module 01 is arranged on an outside edge of a sliding and rolling device. The flexible display module 01 in FIG. 2 is divided into a sliding-rolling active area 011 and a display fixed area 012. The flexible display module 01 in the sliding-rolling active area 011 can increase or decrease a display area of the flexible display module 01 by sliding and rolling movement of the movable housing 2 and the fixed housing 1. The flexible display module 01 in the display fixed area 012 does not move with the sliding and rolling movement of the movable housing 2, that is, there is no change in the display area; that is, the display region of the flexible display module 01 in the rolling state in FIG. 1 is the corresponding display fixed area 012 in FIG. 2.

Figure 3:
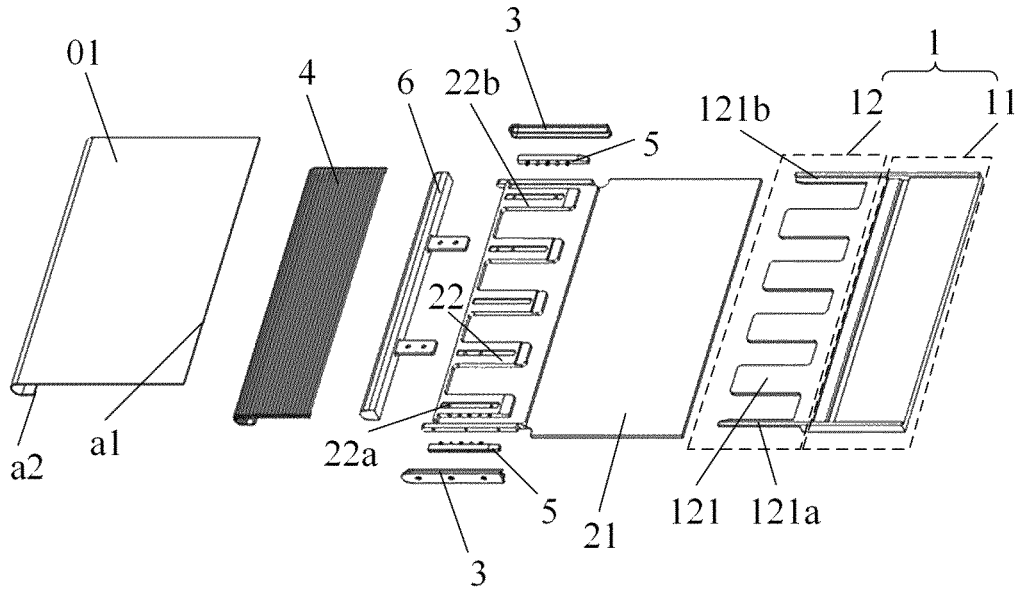
FIG. 3 is an exploded view of a display apparatus provided by embodiments of the present disclosure.

In a first aspect, as shown in FIGS. 1 to 3, embodiments of the present disclosure provide a sliding and rolling device. The sliding and rolling device is configured for assisting a flexible display module 01 in rolling and unrolling by sliding. The flexible display module 01 includes a first side edge a1 and a second side edge a2 that are arranged opposite to each other.

The sliding and rolling device includes:

a fixed housing 1, including a mounting structure 11, where the mounting structure 11 is at least configured for fixing the first side edge a1 of the flexible display module 01;

a movable housing 2, configured to reciprocate in the X direction relative to the fixed housing 1;

a sliding track 3, arranged on at least one side of the movable housing 2 in a Y direction;

a support structure 4, arranged on a side edge of the movable housing 2, where the support structure 4 is slidably arranged in the sliding track 3 along an arc path, a side of the support structure 4 away from the movable housing 2 is configured for supporting the flexible display module 01 and is relatively fixed to at least the second side edge a2 of the flexible display module 01, and the flexible display module 01 slides along the X direction with the support structure 4.

It should be noted that, the movable housing 2 slides relative to the fixed housing 1 along the X direction to realize slidable rolling and unrolling of the flexible display module 01. Specifically, the sliding track 3 is provided on at least one side of the movable housing 2 along the Y direction, and the support structure 4 is slidably provided in the sliding track 3. Here, at least the first side edge a1 of the flexible display module 01 is pasted on the mounting structure 11 of the fixed housing 1 to prevent the flexible display module 01 from moving relative to the fixed housing 1 during the sliding and rolling process. The second side edge a2 of the flexible display module 1 is relatively fixed to the support structure 4. When the support structure 4 performs a track-type sliding movement along the sliding track 3, the movable housing 2 is pushed by the driving force to slide the support structure 4 along the X direction, and the second side edge a2 of the flexible display module 01 is driven to slide, so as to increase the display area of the flexible display module 01. There is relative movement between the flexible display module 01 and the movable housing 2. The support structure 4 performs a track-type sliding movement along the sliding track 3. The sliding track 3 can constrain the flexible display module 01 to reduce the displacement in the Z direction, and the sliding track 3 can also constrain the amount of arching along the X direction and the amount of lifting of the second side edge a2 of the flexible display module 01 during the sliding and rolling process of the flexible display module 01. The external support structure 5 limits the bending and arching of the support structure 4 in the Y direction, that is, it applies a tension force to the flexible display module 01 in the Y direction, thereby reducing the amount of arching of the flexible display module 01 along the Y direction. In addition, the external support structure 5 only applies the tension force to the flexible display module 01 in the Y direction when the display apparatus is completely slid open, thereby ensuring the flatness of the flexible display module 01 in an unrolling state and improving the display effect of the flexible display module 01. Of course, during the sliding and rolling process, the external support structure 5 does not provide the tension force to the support structure 4 in the Y direction, so that the external support structure 5 cannot contact the support structure 4, thereby preventing friction loss to the support structure 4.

Referring to FIG. 3, the sliding and rolling device provided by the embodiments of the present disclosure is described in detail: the movable housing 2 is slidably arranged with the fixed housing 1, the movable housing 2 slides relative to the fixed housing 1, the sliding track 3 is detachably connected with the movable housing 2, the sliding track 3 is arranged on at least one side of the movable housing 2 along the Y direction, of course, in order to increase stability, there are two sliding tracks 3, which are respectively arranged on both sides of the movable housing 2 along the Y direction, and the detachable connection manner of the sliding track 3 and the movable housing 2, for example, can be bolts or screws to relatively fix the sliding track 3 and the movable housing 2. The support structure 4 is located on one side of the movable housing 2 and is slidably arranged in the sliding track 3. The sliding track 3 supports the support structure 4 to move in the track to limit the Z-direction displacement of the flexible display module 01 on the support structure 4, realizing the bending shape of the flexible display module 01, and limiting the amount of arching of the flexible display module 01 along the X direction and the amount of lifting of the second side edge a2 of the flexible display module 01 during the sliding and rolling process of the flexible display panel.

The fixed housing 1 includes a guide structure 12 connected to the mounting structure 11, the guide structure 12 includes a plurality of guide bars 121, the plurality of guide bars 121 are arranged in parallel and spaced apart along the Y direction, and each of the plurality of guide bars 121 extends along the X direction. The movable housing 2 includes: a bottom plate 21 and a plurality of insertion bars 22, the plurality of insertion bars 22 are arranged on a side of the bottom plate 21 facing the support structure 4, the plurality of insertion bars 22 are arranged in parallel and spaced apart along the Y direction, and each of the plurality of insertion bars 22 extends along the X direction. At least one insertion bar 22 is corresponding to a gap area between any two adjacent guide bars 121. For the convenience of understanding and description of the scheme, the plurality of guide bars 121 along the Y direction include the first guide bar 121a and the last guide bar 121b, the plurality of insertion bars 22 along the Y direction include the first insertion bar 22a and the last insertion bar 22b, the external support structure 5 is arranged on the bottom plate 21 of the movable housing 2, and abuts against the first insertion bar 22a. Of course, in order to increase stability, there are two external support structures 5, which abut against the first insertion bar 22a and the last insertion bar 22b respectively. The external support structure 5 constrains the displacement in the Y direction of the support structure 4, and limits the arching of the flexible display module 01 generated in the Y direction during the sliding and rolling process of the sliding and rolling device, the flexible display module 01 switches between the rolling state and the unrolling state. When the flexible display module 01 is in the unrolling state, the external support structure 5 abuts against the support portion 42 to provide a supporting force along the Y direction to the support structure 4. The push rod 6 is detachably arranged on a side of the movable housing 2 away from the fixed housing 1. The outer surface of the push rod 6 is adapted to the support structure 4, and the push rod 6 is always in contact with the support structure 4. The push rod 6 rolls up/slides out with the movable housing 2, pushing the support structure 4 and the flexible display module 01 to slide and roll. For example, the push rod 6 and the movable housing 2 can be connected by bolts or screws. The first side edge a1 of the flexible display module 01 is connected to the mounting structure 11 of the fixed housing 1. For example, the first side edge of the flexible display module 01 is bonded to the mounting structure 11 of the fixed housing 1. The fixed housing 1 always remains fixed during the sliding and rolling movement, the purpose of which is to bond the flexible display module 01 and prevent the flexible display module 01 and the display fixed area 012 from moving relative to each other. The side of the support structure 4 away from the movable housing 2 is configured to support the flexible display module 01. The support structure 4 supports the flexible display module 01 to prevent the virtual position from being pressed and the uneven display. The support structure 4 is at least relatively fixed to the second side edge a2 of the flexible display module 01, so as to increase the firmness of the connection. The overlapping parts of the flexible display module 01 and the support structure 4 are bonded.

Figure 4:
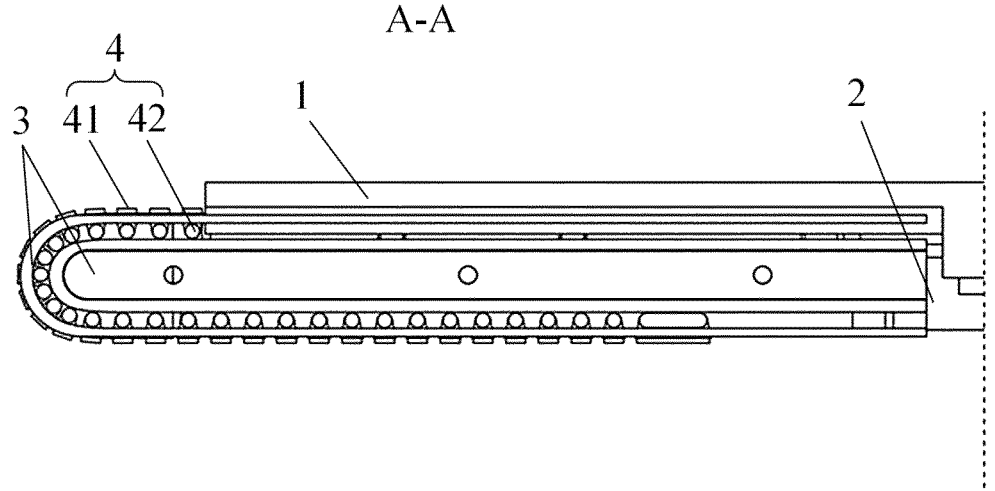
FIG. 4 is a cross-sectional view corresponding to A-A in FIG. 1.
Figure 5:
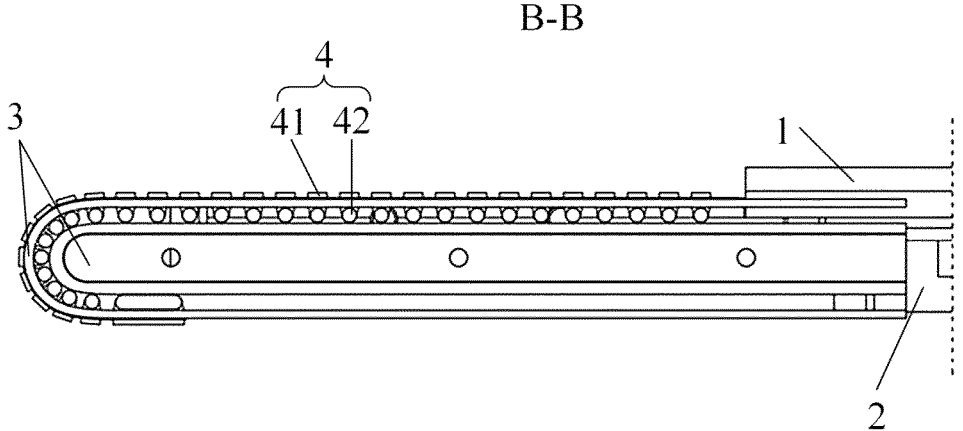
FIG. 5 is a cross-sectional view corresponding to B-B in FIG. 2.

As shown in FIG. 4 and FIG. 5, FIG. 4 is a cross-sectional view along the A-A direction corresponding to the rolling state of the sliding and rolling device in FIG. 1, and FIG. 5 is a cross-sectional view along the B-B direction corresponding to the unrolling state of the sliding and rolling device in FIG. 1. This is used to illustrate the matching relationship between a support body 41 and a support portion 42 in the support structure 4 relative to the sliding track 3. The sliding track 3 includes a track body 31, and the track body 31 is formed with a sliding groove 311; the support structure 4 includes a support body 41 and a support portion(s) 42, the support portion 42 (s) is (are) arranged on both sides of the support body 41 along the Y direction, and the support portion(s) 42 is (are) formed with a protrusion(s) 421, the protrusion 421 protrudes in a direction away from the support body 41, and the protrusion 421 has a sliding fit with the sliding groove 311; the determination of the bending shape of the flexible display module 01 is completed. By utilizing a track-type sliding solution, that is, the protrusion 421 uses the supporting force of the sliding groove 311 to constrain the descending height of the support structure 4 in the Z direction, making the support structure 4 flatter, so that the flexible display module 01 on the support structure 4 can reduce the crease amount and the warping amount of the second side edge a2 of the flexible display module 01 during the sliding and rolling process of the sliding and rolling device.

Figure 6:
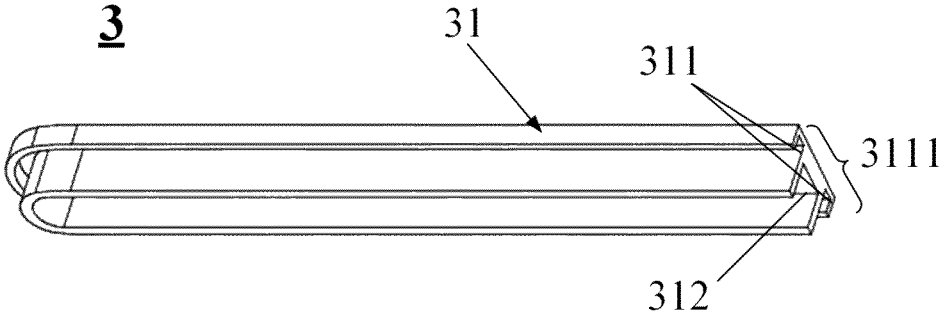
FIG. 6 is a schematic structural diagram of a sliding track provided by embodiments of the present disclosure.

As shown in FIG. 6, regarding the specific structure of the sliding track 3, the sliding track 3 includes a track body 31, the track body 31 is formed with a sliding groove 311, the opening of the sliding groove 311 faces the movable housing 2, the sliding groove 311 is a U-shaped structure, and the opening 3111 of the U-shaped structure faces the movable housing 2; the track body 31 is formed with a mounting groove 312, and the mounting groove 312 is adapted to the movable housing 2. The protrusion 421 in the support portion 42 of the support structure 4 is adapted to the sliding groove 311, for example, in order to reduce the friction force of the protrusion 421 sliding in the sliding groove 311, the outer surface of the protrusion 421 here is an arc, that is, the contact between the protrusion 421 and the sliding groove 311 is a line contact, which effectively reduces the contact area, thereby reducing the friction resistance during the sliding and rolling process.

Figure 7:
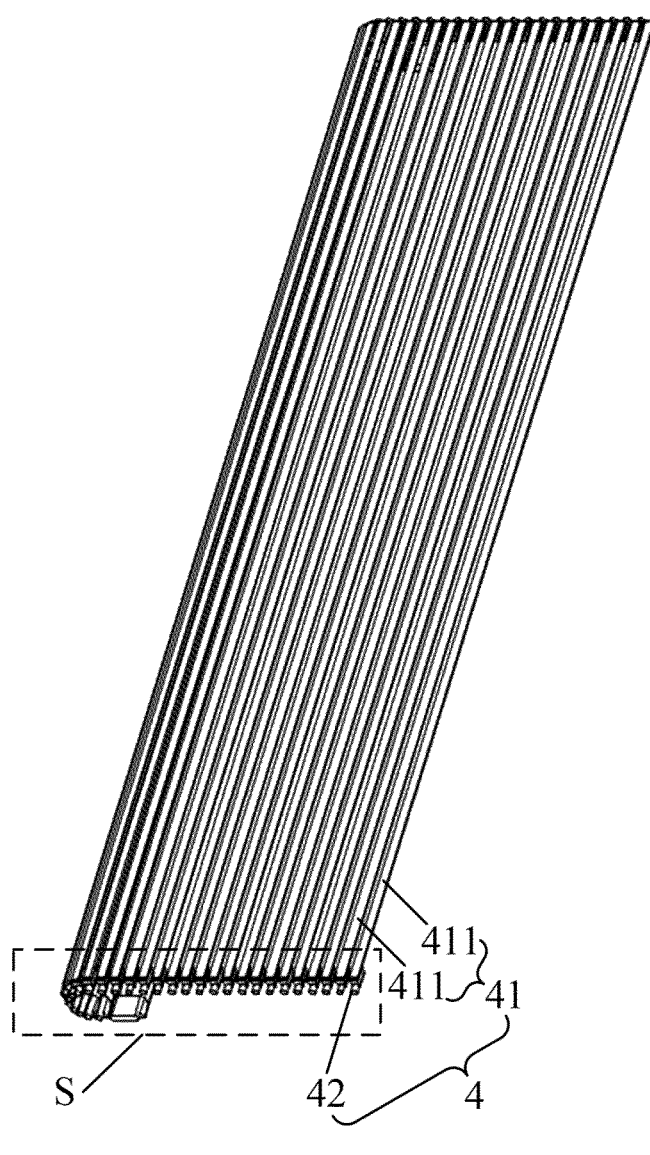
FIG. 7 is a schematic structural diagram of a support structure provided by embodiments of the present disclosure.
Figure 8:
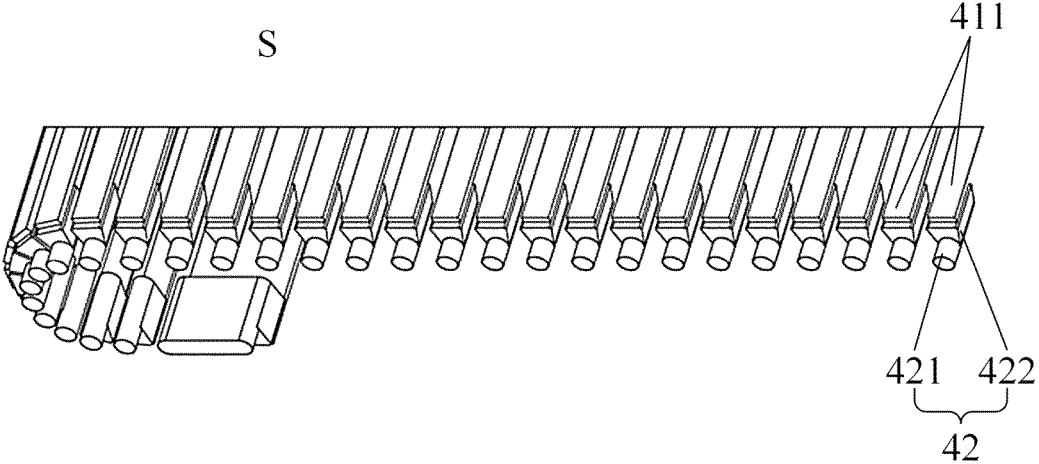
FIG. 8 is a schematic diagram of a partial enlargement of S region in the corresponding FIG. 7.

As shown in FIG. 7 and FIG. 8, the support body 41 includes: a plurality of support bars 411, the plurality of support bars 411 are arranged in parallel and spaced apart along the X direction, and each support bar 411 of the plurality of support bars 411 extends along the Y direction; the support bars 411 are arranged corresponding to the protrusions 421, for example, the support portion 42 is arranged at both ends of the support bar 411, and there are two protrusions 421 formed on the support portion 42, and when the protrusion 421 is adapted to the groove 211 in the sliding track 3, the groove 211 provides the supporting force to the protrusions 421 on both sides along the Y direction at the same time, so that the supporting force on the support bar 411 between the protrusions 421 is the same, which reduces the deformation of the support bar 411 in the Z direction, ensures the strength of the support bar 411, and thus ensures the flatness of the support surface formed by the plurality of support bars 411, so as to improve the flatness of the flexible display module 01 on the support surface.

Figure 9:
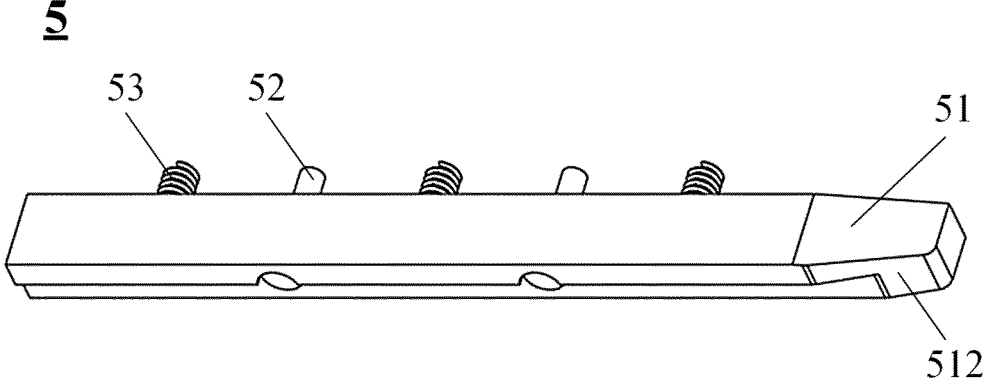
FIG. 9 is a schematic structural diagram of an external support structure provided by embodiments of the present disclosure.
Figure 10:
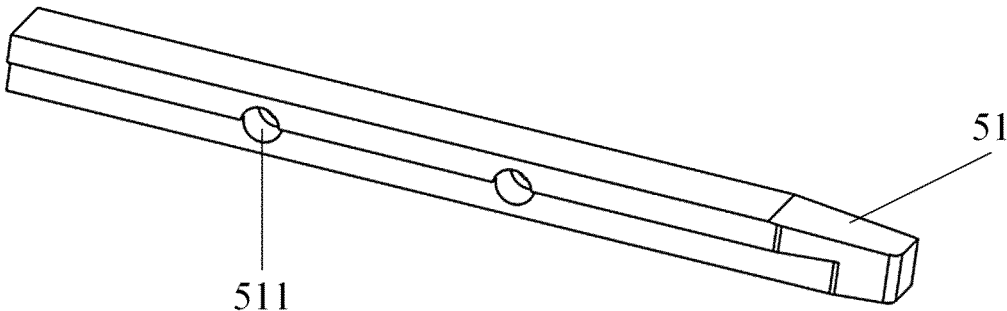
FIG. 10 is a schematic structural diagram of a spring block in an external support structure provided by embodiments of the present disclosure.

FIG. 9 is a schematic diagram of a sliding and rolling device using an external support structure 5 provided by the embodiments of the present disclosure in the corresponding FIG. 3. The external support structure 5 refers to a structure that can be ejected or retracted when the display apparatus performs a sliding and rolling motion. The external support structure 5 includes: a spring block 51, a connecting member 52 and an elastic member 53. FIG. 10 is a schematic structural diagram of the spring block 51 in FIG. 9, the connecting member 52 passes through the stepped hole 511, and the connecting member 52 and the stepped hole 511 cooperate to limit the movement range of the spring block 51, and the specific working process will be described in detail later.

Figure 11:
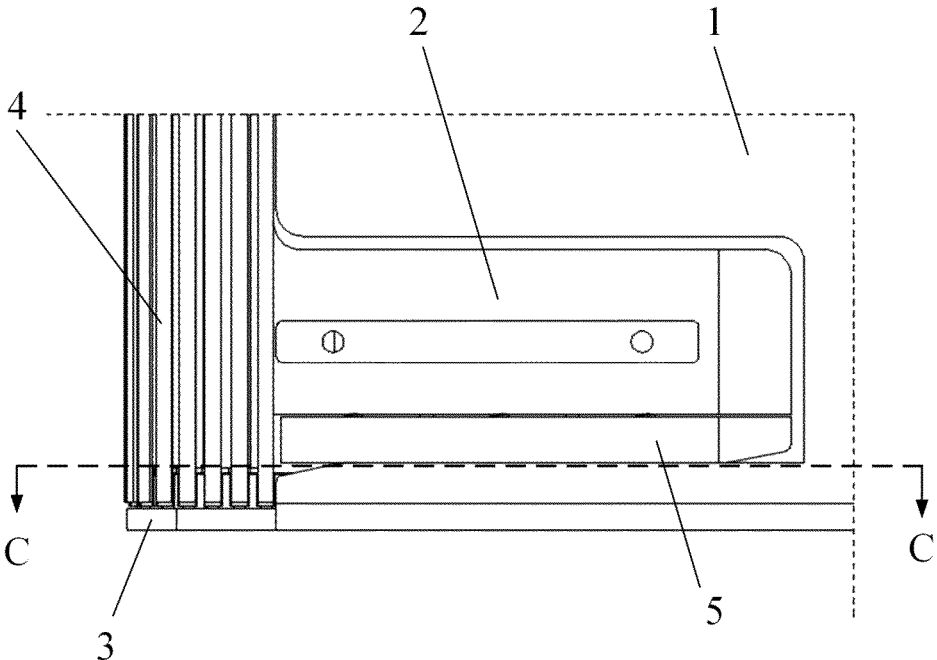
FIG. 11 is a partial enlarged view of a sliding and rolling device using an external support structure in a rolling state provided by embodiments of the present disclosure.
Figure 12:
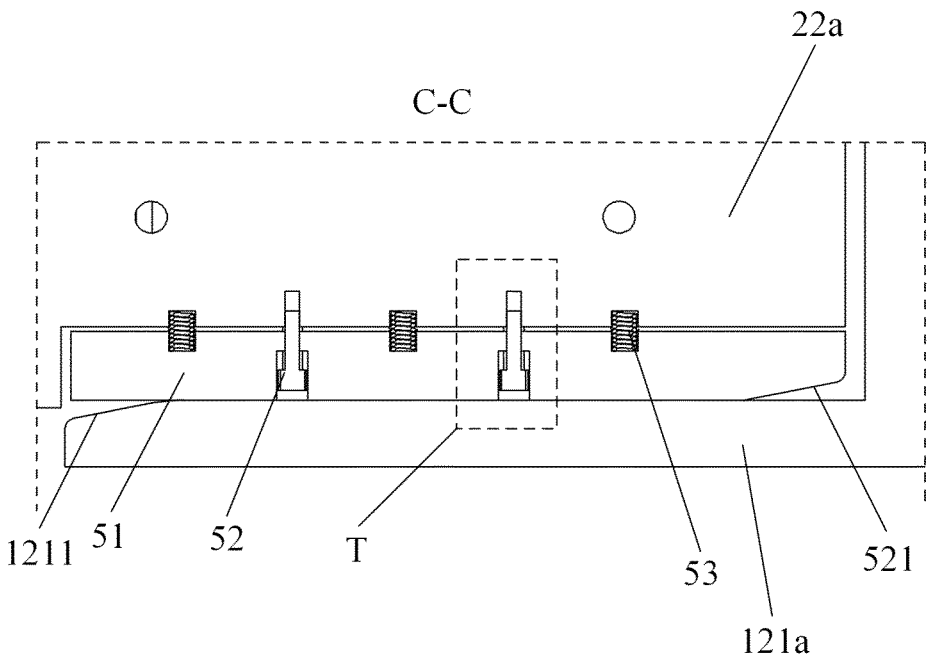
FIG. 12 is a cross-sectional view corresponding to C-C in FIG. 11.

As shown in FIGS. 11 and 12, a partial enlarged view of a sliding and rolling device using an external support structure 5 in a rolling state is provided by the embodiments of the present disclosure. When the flexible display module 01 is in the rolling state, the insertion bar 22 of the movable housing 2 cooperates with the guide bar 121 of the fixed housing 1, and the insertion bar 22 is inserted between two adjacent guide bars 121. There are multiple options for the cooperation between the insertion bar 22 and the guide bar 121. For example, a guide bar 121 may be distributed in the gap area between any two adjacent insertion bars 22, or two guide bars may be distributed in the gap area between any two adjacent insertion bars 22, or three guide bars may be distributed in the gap area between any two adjacent insertion bars 22, and the specific structural form is not limited here, as long as the external support structure 5 shown in FIG. 9 and FIG. 10 is arranged between the first insertion bar 22a among the plurality of insertion bars 22 and the first guide bar 121a among the plurality of guide bars 121 along the Y direction. When the flexible display module 01 is in the unrolling state, the insertion bar 22 of the movable housing 2 and the guide bar 121 of the fixed housing 1 are staggered, and the external support structure 5 abuts against the abutment block 422 of the support portion 42 to provide a supporting force along the Y direction to the support structure 4.

Specifically, the external support structure 5 includes: a spring block 51, a connecting member 52 and an elastic member 53; for example, the elastic member 53 is a structure with elastic restoring force such as a spring sheet or a spring.

Figure 13:
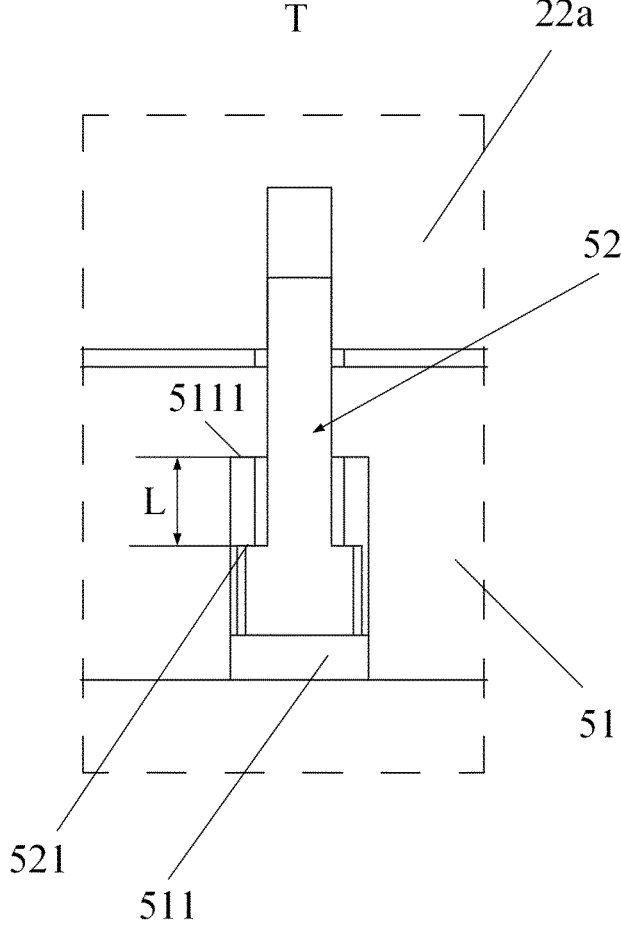
FIG. 13 is a cross-sectional view corresponding to T in FIG. 12.

When the flexible display module 01 is in the rolling state, the spring block 51 is arranged between the first insertion bar 22a and the first guide bar 121a, the connecting member 52 penetrates through the spring block 51 along the Y direction, and the connecting member 52 partially extends into the first insertion bar 22a, there is a gap between the spring block 51 and the first insertion bar 22a, the elastic member 53 is arranged in the gap, and the elastic member 53 has elastic potential energy to move the spring block 51 away from the first insertion bar 22a. The spring block 51 contacts the fixed housing 1, and the elastic member 53 is in a compressed state. As shown in FIG. 13, the connecting member 52 has a step surface 521, and the spring block 51 has a stepped hole 511. The distance between the step surface 521 of the connecting member 52 and the step plane 5111 of the stepped hole 511 is L. When the fixed housing 110 is removed, the maximum distance of the spring block 51 ejected by the compression of the elastic member 53 is L. When the sliding and rolling device is in the rolling state, the support portion 42 of the support structure 4 and the spring block 51 are not in contact with each other.

As shown in FIG. 13, the connecting member 52 has a step surface 521, the spring block 51 has a stepped hole 511, the connecting member 52 passes through the stepped hole 511, one end surface diameter of the stepped hole 511 facing the first insertion bar 22*a* is smaller than the other end surface diameter of the stepped hole 511, the step surface 521 and the stepped hole 511 limit the movement path length of the connecting member 52 in the stepped hole 511, and the distance that the elastic member 53 pops out is smaller than the movement path length.

During the sliding and rolling process of the sliding and rolling device provided in the embodiments of the present disclosure, there is a relative movement between the spring block 51 in the external support structure 5 and the first and last guide bars 121 of the fixed housing 1, the spring block 51 has a first inclined surface 512, and the first guide bar 121*a* has a second inclined surface 1211. The first inclined surface 512 is parallel to the second inclined surface 1211. When the movable housing 2 moves toward the fixed housing 1, the two inclined surfaces move relative to each other, thereby reducing the resistance during the sliding and rolling process.

Figure 14:
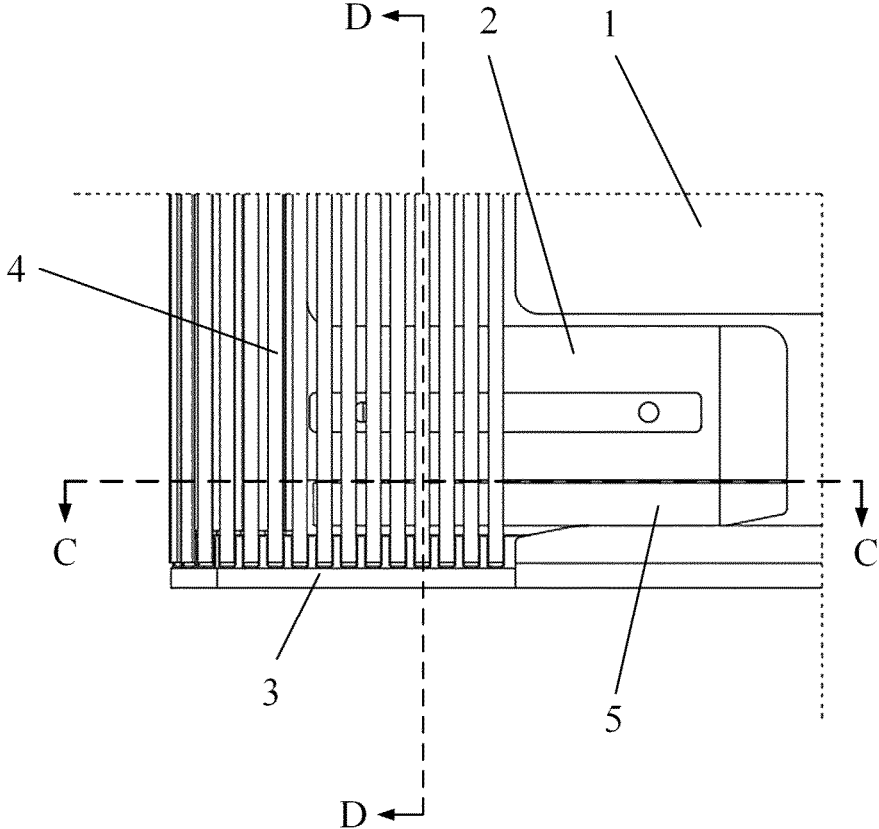
FIG. 14 is a partial enlarged view of a sliding and rolling device using an external support structure to switch between a rolling state and an unrolling state provided by embodiments of the present disclosure.
Figure 15:
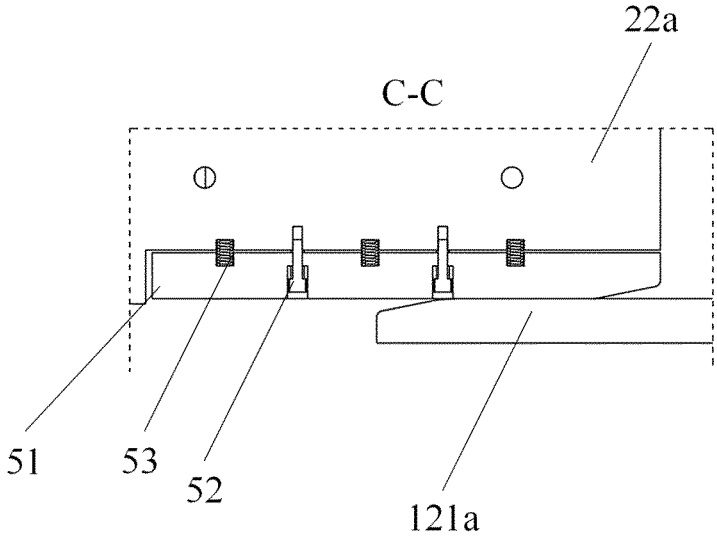
FIG. 15 is a cross-sectional view corresponding to C-C in FIG. 14.
Figure 16:
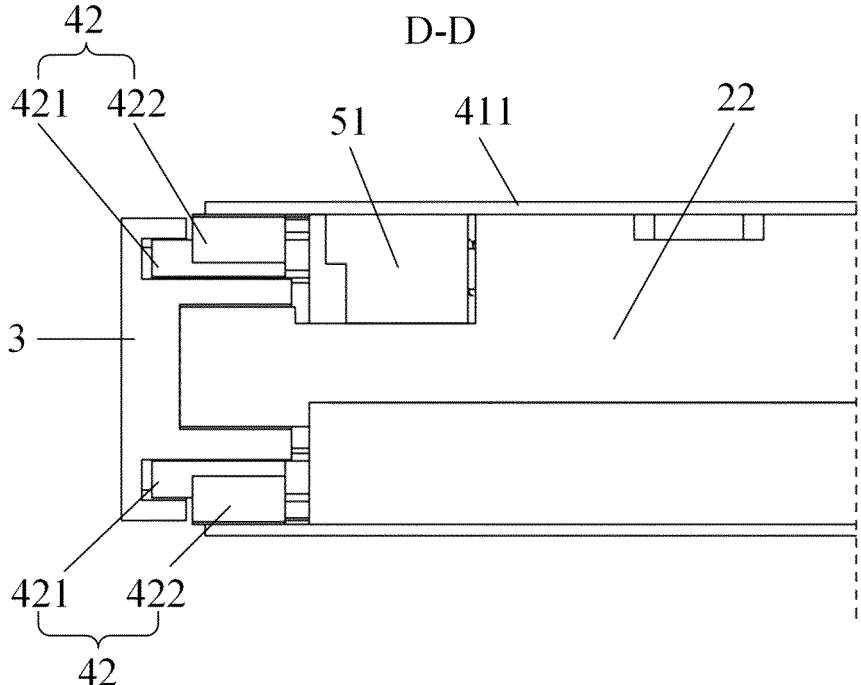
FIG. 16 is a cross-sectional view corresponding to D-D in FIG. 14.

As shown in FIGS. 14 to 16, at this time, the elastic member 53 is still in a compressed state. In addition, the spring block 51 is not in contact with the support portion 42 of the support structure 4.

Figure 17:
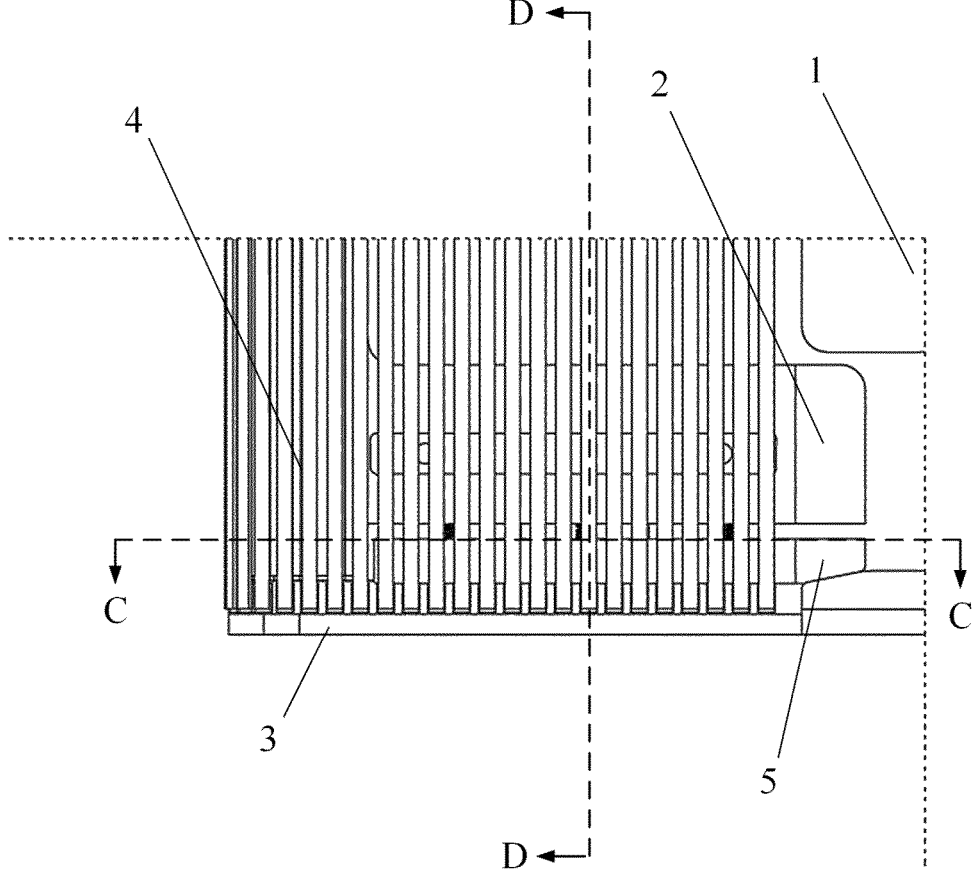
FIG. 17 is a partial enlarged view of a sliding and rolling device using an external support structure in an unrolling state provided by embodiments of the present disclosure.
Figure 18:
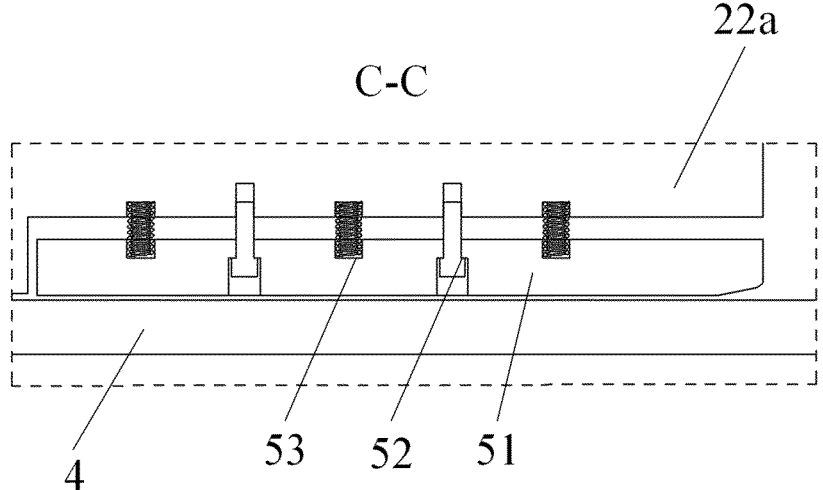
FIG. 18 is a cross-sectional view corresponding to C-C in FIG. 17.
Figure 19:
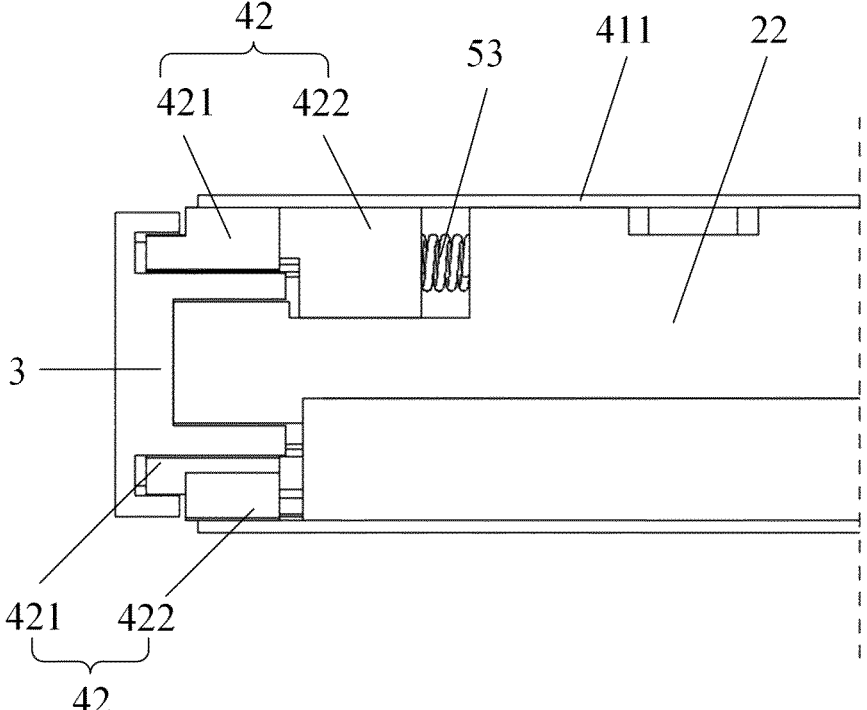
FIG. 19 is a cross-sectional view corresponding to D-D in FIG. 17.

As shown in FIGS. 17 to 19, FIG. 17 shows the sliding state of the display apparatus, at which time the first guide bar 121*a* in the fixed housing 1 releases the constraint on the spring block 51. As shown in FIG. 18, the elastic member 53 is relaxed, pushing the spring block 51 to slide outward, that is, the spring block 51 slides toward the first guide bar 121*a*, so that the gap between the first insertion bar 22*a* and the spring block 51 becomes larger, as shown in FIG. 13, and the sliding distance is L. As a result, as shown in FIG. 19, the spring block 51 supports the support portion 42 of the support structure 4. The benefit brought is that the bending and arching of the support structure 4 in the Y direction is limited, that is, the tension force in the Y direction of the flexible display module 01 is applied, thereby reducing the amount of arching of the flexible display module 01 along the Y direction. In addition, the spring block 51 applies the tension force in the Y direction to the flexible display module 01 only when the display apparatus is completely slid open. During the sliding and rolling process, the pop-up stroke is limited by the fixed housing 1, that is, the pop-up stroke is less than L. Therefore, the spring block 51 cannot contact the support portion 42 of the support structure 4, thereby preventing friction loss to the support portion 42 of the support structure 4.

Figure 20:
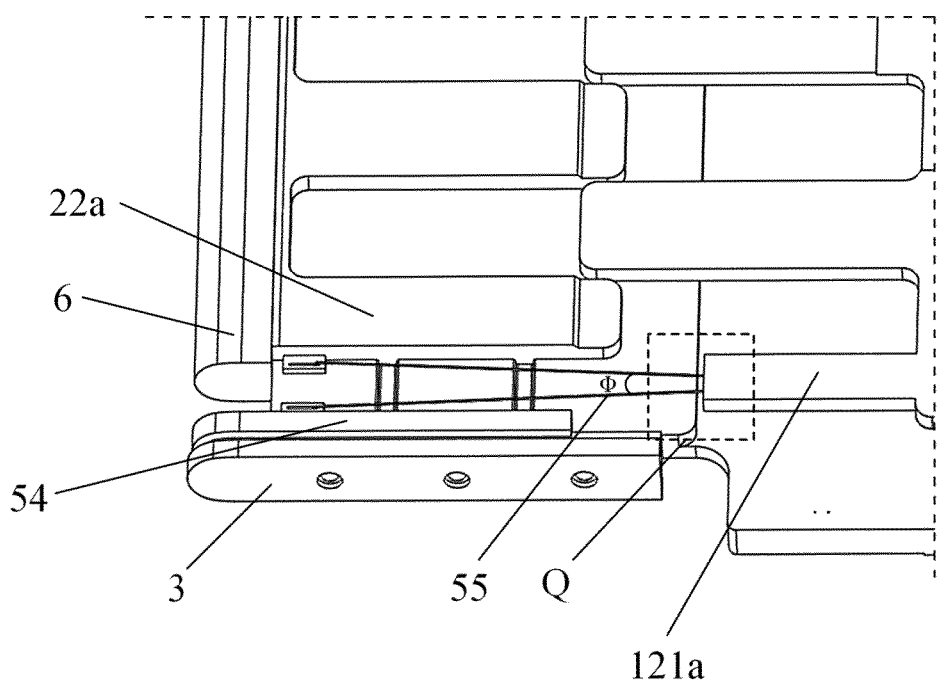
FIG. 20 is a partial enlarged view of a sliding and rolling device using another external support structure in an unrolling state provided by embodiments of the present disclosure.

As shown in FIG. 20, FIG. 20 is a partial enlarged view of a sliding and rolling device using another external support structure 5 in an unrolling state provided by embodiments of the present disclosure. When the flexible display module 01 is in a rolling state, the insertion bar 22 of the movable housing 2 cooperates with the guide bar 121 of the fixed housing 1, and the insertion bar 22 is inserted between two adjacent guide bars 121, and an external support structure 5 is provided between the first guide bar 121*a* of the plurality of guide bars 121 and the sliding track 3 along the Y direction.

When the flexible display module 01 is in the unrolling state, the insertion bar 22 of the movable housing 2 and the guide bar 121 of the fixed housing 1 are staggered, and the external support structure 5 abuts against the support portion 42 to provide a supporting force along the Y direction to the support structure 4.

Figure 21:
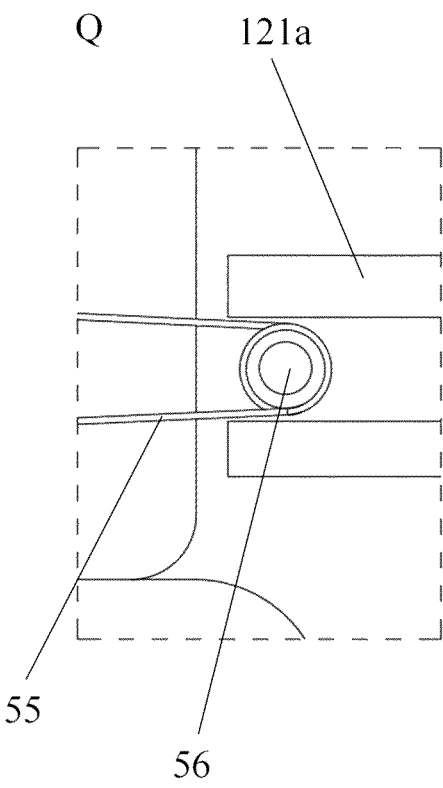
FIG. 21 is a partial cross-sectional view corresponding to the Q region in FIG. 20.
Figure 22:
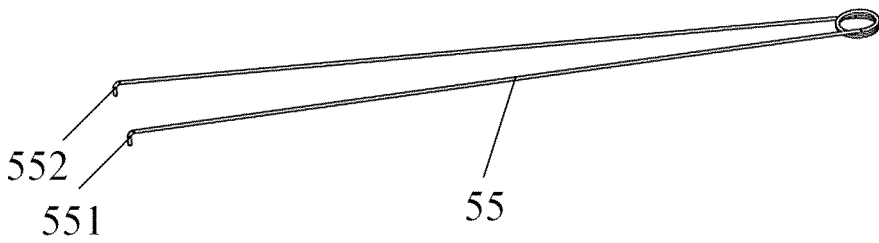
FIG. 22 is a schematic structural diagram of a torsion spring corresponding to FIG. 20.

As shown in FIG. 20, the external support structure 5 includes: a spring block 54 and a torsion spring 55; referring to FIGS. 21 and 22, the first guide bar 121*a* is provided with a positioning column 56; the first end 551 of the torsion spring 55 is connected to the first insertion bar 22*a*, the torsion spring 55 bypasses the positioning column 56, and the second end 552 of the torsion spring 55 is connected to the spring block 54.

As shown in FIG. 20, the sliding and rolling device is in the unrolling state. Compared with the spring used in FIG. 17, the torsion spring 55 occupies less space along the Z direction, thereby improving the space utilization of the whole machine. When the opening and closing angle @ of the torsion spring 55 changes, the length change of the two arms of the torsion spring 55 along the X direction is absorbed. FIG. 21 shows the constraint mode between the torsion spring 55 and the movable housing 2 and the fixed housing 1. The torsion spring 55 is fixed to the fixed housing 1 through the positioning column 56 and is enclosed by the fixed housing 1. The fixed housing 1 can constrain the two arms of the torsion spring 55, that is, control its opening angle @, at which time the spring block 54 pops out.

Figure 23:
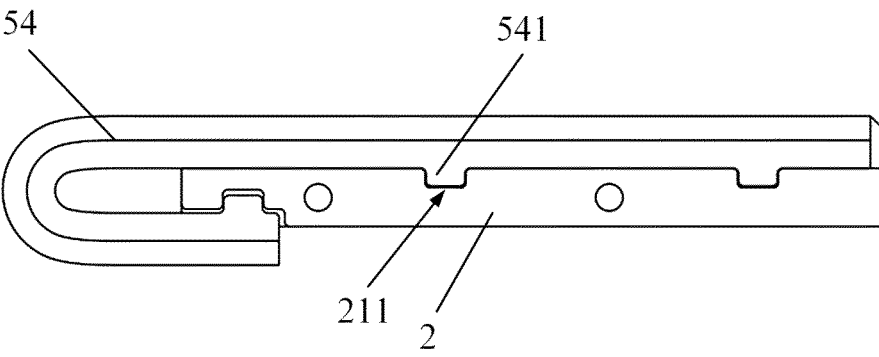
FIG. 23 is a schematic structural diagram of the matching of a spring block and a movable housing corresponding to FIG. 20.

As shown in FIG. 23, the spring block 54 has a protrusion block 541, and the bottom plate 21 of the movable housing 2 has a groove 211 corresponding to the protrusion block 541.

Alternatively, the spring block 54 has a groove 211, and the bottom plate 21 of the movable housing 2 has a protrusion block 541 corresponding to the groove 211.

FIG. 23 shows the cooperation between the spring block 54 and the movable housing 2. The spring block 54 has multiple protrusions 421, specifically, there may be three protrusions 421. The movable housing 2 has three grooves 211. The three protrusions 421 cooperate with the three grooves 211. The advantage is that the displacement of the spring block 54 along the X and Z directions is constrained, and the spring block 54 can slide as a whole along the Y direction to avoid tilting.

Figure 24:
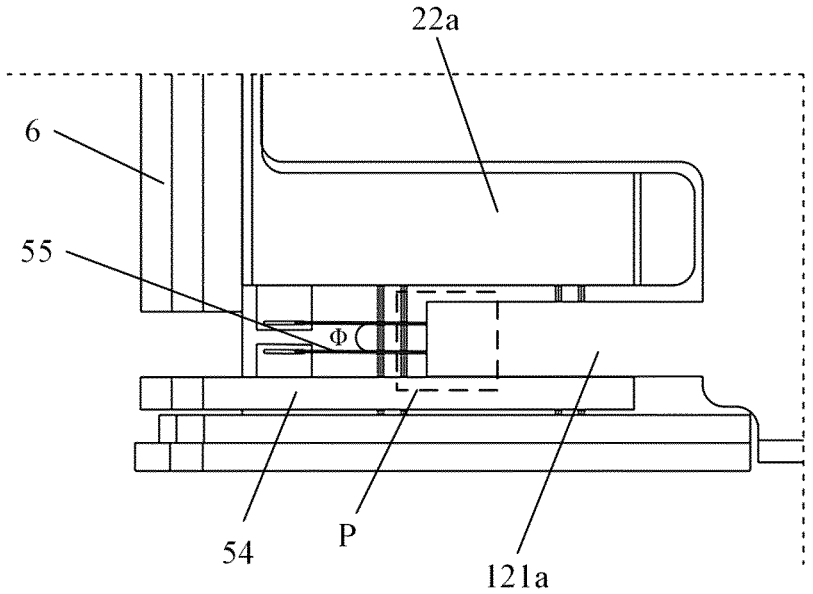
FIG. 24 is a partial enlarged view of a sliding and rolling device using another external support structure in a rolling state provided by embodiments of the present disclosure.
Figure 25:
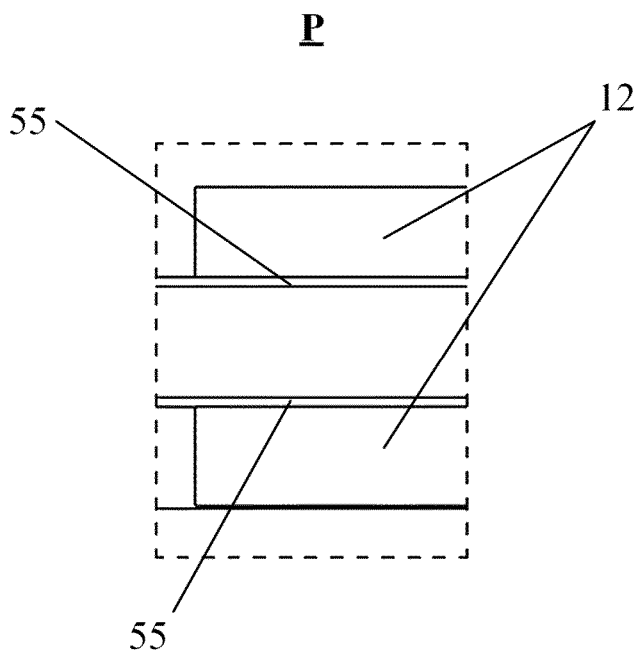
FIG. 25 is a partial cross-sectional view corresponding to the P region in FIG. 24.

FIG. 24 is a partial enlarged view of a sliding and rolling device using another external support structure 5 in the rolling state provided by the embodiments of the present disclosure. Referring to FIG. 25, the movable housing 2 moves along the X direction, driving the torsion spring 55 to be retracted into the fixed housing 1, and reducing the opening and closing angle @ of the torsion spring 55, driving the spring block 54 to slide along the Y direction, thereby realizing the retraction of the spring block 54. The rolling or unrolling of the spring block 54 is determined by the rolling or unrolling state of the movable housing 2.

In a second aspect, a display apparatus provided by embodiments of the present disclosure includes the sliding and rolling device of any one of the first aspect, and also includes a flexible display module 01; the flexible display module 01 is arranged on one side of the support structure 4 and the fixed housing 1 in the sliding and rolling device, and the sliding and rolling device can assist the flexible display module 01 in slidable rolling and unrolling.

Obviously, those skilled in the art can make various changes and modifications to the present disclosure without departing from the spirit and scope of the present disclosure. Thus, if these modifications and variations of the present disclosure fall within the scope of the claims of this application and their equivalents, the present disclosure is also intended to include these modifications and variations.

What is claimed is:

1. A sliding and rolling device, wherein the sliding and rolling device is configured for assisting a flexible display module in rolling and unrolling by sliding, and the flexible display module comprises a first side edge and a second side edge arranged opposite to each other in an X direction;

wherein the sliding and rolling device comprises:

a fixed housing, comprising a mounting structure, wherein the mounting structure is at least configured for fixing the first side edge of the flexible display module;

a movable housing, configured to reciprocate in the X direction relative to the fixed housing;

a sliding track, arranged on at least one side of the movable housing in a Y direction, wherein the Y direction is perpendicular to the X direction, and a plane formed by the X direction and the Y direction is parallel to the flexible display module;

a support structure, arranged on a side of the movable housing, wherein the support structure is slidably arranged in the sliding track along an arc path, a side of the support structure away from the movable housing is configured for supporting the flexible display module and is relatively fixed to at least the second side edge of the flexible display module, and the flexible display module is configured to slide along the X direction with the support structure;

an external support structure, contacting the movable housing along the Y direction, wherein when the flexible display module unrolls, the external support structure abuts against both the support structure and the movable housing to provide a supporting force along the Y direction to the support structure, so that a distance between the support structure and the sliding track in the Y direction is reduced.

2. The sliding and rolling device according to claim 1, wherein the sliding track comprises a track body, and the track body is provided with a sliding groove;

an opening of the sliding groove faces the movable housing, the sliding groove is a U-shaped structure, and an opening of the U-shaped structure faces the movable housing;

the support structure comprises a support body and a support portion, the support portion is arranged on both sides of the support body in the Y direction and is provided with a protrusion, and the protrusion protrudes in a direction away from the support body and has a sliding fit with the sliding groove.

3. The sliding and rolling device according to claim 2, wherein the support body comprises: a plurality of support bars, the plurality of support bars are arranged in parallel and spaced apart along the X direction, and each of the plurality of support bars extends along the Y direction;

the support bar and the protrusion are arranged in a corresponding manner.

4. The sliding and rolling device according to claim 1, wherein the fixed housing comprises a guide structure connected to the mounting structure, the guide structure comprises a plurality of guide bars, the plurality of guide bars are arranged in parallel and spaced apart along the Y direction, and each of the plurality of guide bars extends along the X direction;

the movable housing comprises: a bottom plate and a plurality of insertion bars, wherein the plurality of insertion bars are arranged on a side of the bottom plate facing the support structure, the plurality of insertion bars are arranged in parallel and spaced apart along the Y direction, and each of the plurality of insertion bars extends along the X direction;

at least one of the insertion bars is corresponding to a gap area between any two adjacent guide bars.

5. The sliding and rolling device according to claim 4, wherein the external support structure abuts against a first insertion bar of the plurality of insertion bars arranged along the Y direction;

during movement of the movable housing relative to the fixed housing along the X direction, the flexible display module switches between a rolling state and an unrolling state;

when the flexible display module is in the unrolling state, the external support structure abuts against the support portion.

6. The sliding and rolling device according to claim 5, wherein, when the flexible display module is in the rolling state, the insertion bar of the movable housing cooperates with the guide bar of the fixed housing, the insertion bar is inserted between two adjacent guide bars, and the external support structure is arranged, along the Y direction, between the first insertion bar of the plurality of insertion bars and a first guide bar of the plurality of guide bars;

when the flexible display module is in the unrolling state, the insertion bar of the movable housing and the guide bar of the fixed housing are staggered in the X direction, and the external support structure abuts against the support portion to provide a supporting force along the Y direction to the support structure.

7. The sliding and rolling device according to claim 6, wherein the external support structure comprises: a spring block, a connecting member and an elastic member;

when the flexible display module is in the rolling state, the spring block is arranged between the first insertion bar and the first guide bar, the connecting member penetrates through the spring block along the Y direction, and the connecting member partially extends into the first insertion bar, a gap is provided between the spring block and the first insertion bar, the elastic member is arranged in the gap, and the elastic member has elastic potential energy for moving the spring block in a direction away from the first insertion bar.

8. The sliding and rolling device according to claim 7, wherein the connecting member has a step surface, the spring block has a stepped hole, the connecting member passes through the stepped hole, one end surface diameter of the stepped hole facing the first insertion bar is smaller than the other end surface diameter of the stepped hole, the step surface and the stepped hole limit a movement path length of the connecting member in the stepped hole, and a distance that the elastic member pops out is smaller than the movement path length.

9. The sliding and rolling device according to claim 8, wherein the spring block has a first inclined surface, the first guide bar has a second inclined surface, and the first inclined surface is parallel to the second inclined surface.

10. The sliding and rolling device according to claim 5, wherein a quantity of external support structures is two, and along the Y direction, the external support structures are respectively arranged at the first insertion bar and a last insertion bar of the plurality of insertion bars.

11. The sliding and rolling device according to claim 5, wherein, when the flexible display module is in the rolling state, the insertion bar of the movable housing cooperates with the guide bar of the fixed housing, the insertion bar is inserted between two adjacent guide bars, and the external support structure is provided, along the Y direction, between the first guide bar of the plurality of guide bars and the sliding track;

when the flexible display module is in the unrolling state, the insertion bar of the movable housing and the guide bar of the fixed housing are staggered in the X direction, and the external support structure abuts against the support portion to provide a supporting force along the Y direction to the support structure.

12. The sliding and rolling device according to claim 11, wherein the external support structure comprises: a spring block and a torsion spring;

one end of the torsion spring is connected to the first insertion bar, the torsion spring bypasses the positioning column, and the other end of the torsion spring is connected to the spring block.

13. The sliding and rolling device according to claim 12, wherein the spring block has a protrusion block, and the bottom plate of the movable housing has a groove corresponding to the protrusion block;

or, the spring block has a groove, and the bottom plate of the movable housing has a protrusion block corresponding to the groove.

14. The sliding and rolling device according to claim 1, further comprising a push rod;

the push rod is detachably arranged on a side of the movable housing away from the fixed housing, an outer surface of the push rod is adapted to the support structure, and the push rod is always in contact with the support structure.

15. A display apparatus, comprising a sliding and rolling device, wherein the sliding and rolling device is configured for assisting a flexible display module in rolling and unrolling by sliding, and the flexible display module comprises a first side edge and a second side edge arranged opposite to each other in an X direction;

wherein the sliding and rolling device comprises:

a fixed housing, comprising a mounting structure, wherein the mounting structure is at least configured for fixing the first side edge of the flexible display module;

a movable housing, configured to reciprocate in the X direction relative to the fixed housing;

a sliding track, arranged on at least one side of the movable housing in a Y direction, wherein the Y direction is perpendicular to the X direction, and a plane formed by the X direction and the Y direction is parallel to the flexible display module;

a support structure, arranged on a side of the movable housing, wherein the support structure is slidably arranged in the sliding track along an arc path, a side of the support structure away from the movable housing is configured for supporting the flexible display module and is relatively fixed to at least the second side edge of the flexible display module, and the flexible display module is configured to slide along the X direction with the support structure;

an external support structure, contacting the movable housing along the Y direction, wherein when the flexible display module unrolls, the external support structure abuts against both the support structure and the movable housing to provide a supporting force along the Y direction to the support structure, so that a distance between the support structure and the sliding track in the Y direction is reduced;

wherein the display apparatus further comprises the flexible display module;

wherein the flexible display module is arranged on a side of the support structure and the fixed housing in the sliding and rolling device.

* * * * *